United States Patent
Liang et al.

(10) Patent No.: US 12,420,472 B2
(45) Date of Patent: Sep. 23, 2025

(54) ADDITIVE MANUFACTURE OF HIERARCHICALLY POROUS MATERIALS WITH HIGH RESOLUTION

(71) Applicant: Lawrence Livermore National Security, LLC, Livermore, CA (US)

(72) Inventors: Siwei Liang, Dublin, CA (US); Theodore F. Baumann, Discovery Bay, CA (US); Eric B. Duoss, Dublin, CA (US); Christopher M. Spadaccini, Oakland, CA (US); Marcus A. Worsley, Hayward, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1383 days.

(21) Appl. No.: 16/362,450

(22) Filed: Mar. 22, 2019

(65) Prior Publication Data
US 2020/0298466 A1    Sep. 24, 2020

(51) Int. Cl.
| | |
|---|---|
| B29C 64/106 | (2017.01) |
| B29C 64/209 | (2017.01) |
| B33Y 10/00 | (2015.01) |
| B33Y 70/00 | (2020.01) |
| B33Y 70/10 | (2020.01) |
| B33Y 80/00 | (2015.01) |
| C08K 3/22 | (2006.01) |
| C08L 53/00 | (2006.01) |
| C08L 61/02 | (2006.01) |

(52) U.S. Cl.
CPC .......... *B29C 64/106* (2017.08); *B29C 64/209* (2017.08); *B33Y 70/00* (2014.12); *B33Y 70/10* (2020.01); *C08K 3/22* (2013.01); *C08L 53/00* (2013.01); *C08L 61/02* (2013.01); *B33Y 10/00* (2014.12); *B33Y 80/00* (2014.12)

(58) Field of Classification Search
CPC . C08K 3/22; C08L 53/00; C08L 61/02; B29C 64/106; B29C 64/209; B33Y 70/10; B33Y 10/00; B33Y 70/00; B33Y 80/00
USPC ........................................................ 522/179
See application file for complete search history.

(56) References Cited

U.S. PATENT DOCUMENTS

| | | | | |
|---|---|---|---|---|
| 6,140,391 A | * | 10/2000 | Zou ........................ | C09D 11/36 428/526 |
| 10,767,062 B2 | * | 9/2020 | Chandrasekaran .... | B33Y 70/00 |
| 2004/0241237 A1 | | 12/2004 | Pirard et al. | |
| 2006/0171990 A1 | | 8/2006 | Asgari | |
| 2007/0167534 A1 | | 7/2007 | Coronado et al. | |
| 2008/0044575 A1 | | 2/2008 | Mirkin et al. | |
| 2009/0110843 A1 | | 4/2009 | Halahmi et al. | |
| 2009/0281234 A1 | * | 11/2009 | Ando ....................... | C08J 3/201 524/577 |
| 2013/0084449 A1 | | 4/2013 | Lewis et al. | |
| 2013/0237646 A1 | | 9/2013 | Harders et al. | |
| 2015/0024122 A1 | | 1/2015 | Wu et al. | |
| 2016/0067891 A1 | | 3/2016 | Worsley et al. | |
| 2018/0251645 A1 | | 9/2018 | Magdassi et al. | |
| 2018/0320008 A1 | | 11/2018 | Fedynyshyn et al. | |
| 2018/0345598 A1 | * | 12/2018 | Chandrasekaran ..... | C01B 32/00 |
| 2019/0127598 A1 | * | 5/2019 | Bernhardt .............. | C09D 11/30 |
| 2021/0087419 A1 | | 3/2021 | Zhu et al. | |
| 2021/0115279 A1 | * | 4/2021 | Rau ......................... | G03F 7/029 |

FOREIGN PATENT DOCUMENTS

| | | |
|---|---|---|
| WO | 2017029673 A1 | 2/2017 |
| WO | 2017079130 A1 | 5/2017 |

OTHER PUBLICATIONS

Lee et al., "Simple Synthesis of Uniform Mesoporous Carbons with Diverse Structures from Mesostructured Polymer/Silica Nanocomposites," Chem. Mater., ,vol. 16, No. 17, 3323-3330. (Year: 2004).*
Liu et al., "Triconstituent Co-assembly to Ordered Mesostructured Polymer-Silica and Carbon-Silica Nanocomposites and Large-Pore Mesoporous Carbons with High Surface Areas," JACS Articles, Aug. 10, 2006, pp. 11652-11662.
International Preliminary Examination Report from PCT Application No. PCT/US2020/023844, dated Oct. 7, 2021.
International Search Report and Written Opinion from PCT Application No. PCT/US2020/023844, dated Aug. 7, 2020.
Zhu et al., U.S. Appl. No. 16/772,627, filed Jun. 12, 2020.
Restriction Requirement from U.S. Appl. No. 16/772,627, dated Oct. 6, 2022.
Duoss et al., "Sol-Gel Inks for Direct-Write Assembly of Functional Oxides," Advanced Materials, vol. 19, 2007, pp. 3485-3489.
International Search Report and Written Opinion from PCT Application No. PCT/US2019/23553, dated Aug. 7, 2019.
International Preliminary Examination Report from PCT Application No. PCT/US2019/23553, dated Oct. 8, 2020.
Non-Final Office Action from U.S. Appl. No. 16/772,627, dated Dec. 21, 2022.
Final Office Action from U.S. Appl. No. 16/772,627, dated Jun. 8, 2023.

* cited by examiner

*Primary Examiner* — Wenwen Cai
(74) *Attorney, Agent, or Firm* — Zilka-Kotab, P.C.

(57) ABSTRACT

In one embodiment, an ink includes a polymer precursor, a copolymer, a catalyst, and a solvent. In another embodiment, a product includes a three-dimensional printed structure having ligaments, where an average diameter of the ligaments is in a range of about 10 microns to about 500 microns.

18 Claims, 6 Drawing Sheets

ADDITIVE MANUFACTURE OF HIERARCHICALLY POROUS MATERIALS WITH HIGH RESOLUTION

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of hierarchically porous materials, and more particularly, this invention relates to an ink system for additive manufacturing of hierarchically porous materials with high resolution, use thereof, and resulting products.

BACKGROUND

Porous materials including polymer, ceramic, and metal have been of great interest in a variety of applications, such as catalyst technology, energy storage and conversion, structure supporting scaffold and light-weight materials with high performance. A hierarchically porous structure has advantages over regular porous structures in terms of more efficient mass transport and accessibility to different pores.

Three-dimensional (3D) printing provides the ability to create an orderly structure to tune a mass flow.

SUMMARY

In one embodiment, an ink includes a polymer precursor, a copolymer, a catalyst, and a solvent.

In another embodiment, a method includes printing a three-dimensional structure using an ink that includes a polymer precursor, a block copolymer, a catalyst, and a solvent, immersing the printed three-dimensional structure in a second solvent for forming a gel, and drying the printed three-dimensional structure.

In yet another embodiment, a product includes a three-dimensional printed structure having ligaments, where an average diameter of the ligaments is in a range of about 10 microns to about 500 microns.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 6B, parts (b) and (c) are a series of scanning electron microscope images of the carbonized porous silica structure of part (a), according to one embodiment. The image of part (c) is a magnified view of a portion of the image of part (b).

DETAILED DESCRIPTION

Figure 1:
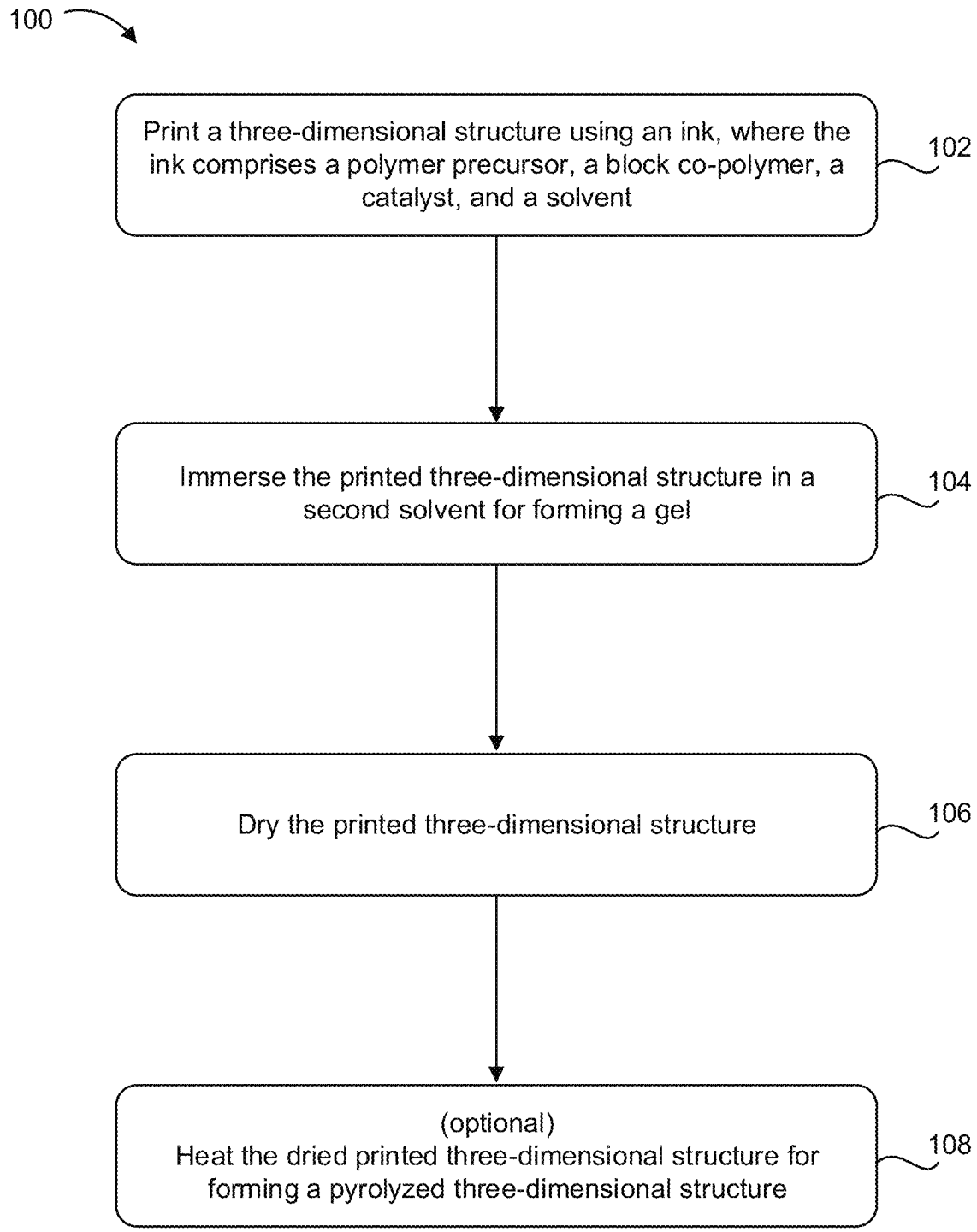
FIG. 1 is a flowchart of a method, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

The nanoscale is defined as between 1 nanometer and about 500 nanometers.

For the purposes of this description, macropores are defined as having an average diameter of greater than 1 millimeter (mm). Mesopores are defined as having an average diameter of less than 1 mm and greater than about 10 microns (μm). Micropores are defined as having an average diameter less than about 10 μm and greater than about 100 nanometers (nm). Nanopores are defined as having an average diameter less than 1 μm and greater than 0 nanometers. These ranges are approximate and may overlap, e.g., a large nanopore may also be defined as a small micropore.

The following description discloses several preferred embodiments of hierarchically porous materials and/or related additive manufacturing systems, methods, and products formed by the same.

In one general embodiment, an ink includes a polymer precursor, a copolymer, a catalyst, and a solvent.

In another general embodiment, a method includes printing a three-dimensional structure using an ink that includes a polymer precursor, a block copolymer, a catalyst, and a solvent, immersing the printed three-dimensional structure in a second solvent for forming a gel, and drying the printed three-dimensional structure.

In yet another general embodiment, a product includes a three-dimensional printed structure having ligaments, where an average diameter of the ligaments is in a range of about 10 microns to about 500 microns.

A list of acronyms used in the description is provided below.

3D Three-dimensional
C Celsius
cm centimeter
DIW Direct ink writing
µm micron
mg milligram
mm millimeter
nm nanometer
SEM Scanning electron microscope Conventional 3D printing processes form structures with limited ligament sizes dependent on particle size and concentration in the inks for direct-ink writing. According to various embodiments described herein, an ink system for direct-ink writing enables creation of hierarchically porous structures via 3D printing by a method of phase-separation and sol-gel process. According to one embodiment, an ink is powder free and enables printing of an ultrafine 3D structure. In some approaches, the average ligament size of the ultrafine structure may be less than 100 microns (µm). The pores of the formed 3D structure have an average diameter in a range from about a few nanometers to hundreds of microns. Various embodiment described herein provide a feasible way to fabricate highly-order hierarchically porous carbon, ceramic and metal hybrid-materials.

Additive manufacturing techniques using light initiated processes, such as two-photon polymerization (TPP) laser printing generate small features, but the disadvantage of these processes is the parts are very small as well. Using the ink in additive manufacturing techniques such as direct ink writing (DIW) allows printing of structures with fine resolution. In some approaches, the ink may be used in a nozzle having an extrusion diameter in a range of less than 800 µm to about 10 µm. According to various embodiments described herein, a particle-free ink as described allows the DIW process of additive manufacturing generate large parts on the order of centimeters to tens of centimeters having features having an average fine resolution in a range of less than 100 µm to about 30 µm, and may be smaller.

According to one embodiment, an ink includes a polymer precursor, a copolymer, a catalyst, and a solvent. Preferably, the ink is substantially free of particles. In some approaches, the solvent may be a solvent mixture.

In some approaches, the polymer precursor may include a formaldehyde resin. Illustrative examples of formaldehyde resins include: phenol formaldehyde resin, urea formaldehyde resin, resorcinol formaldehyde, melamine formaldehyde resin, etc. In other approaches, the polymer resin may include an epoxy resin.

In various approaches, a different formulation of the polymer precursor in the ink may yield a different final morphology of the final porous pyrolyzed structure. In some approaches, a low content resol-like polymer precursor may yield a bicontinuous hierarchically porous pyrolyzed structure, where a bicontinuous hierarchically porous structure may be defined as having two distinct phases that are continuous and coexist in the structure. In other approaches, a high content resol-like polymer precursor may yield a hierarchically porous pyrolyzed structure, where a hierarchically porous structure (having no indication of the continuous nature of the pores) may be defined as having pores separated by a carbon backbone and the pores may or may not be continuous.

In one approach, the copolymer is a triblock copolymer. Illustrative examples of a triblock copolymer include Pluronic® F127, P105, F68, etc. According to another approach, the copolymer may be a non-block polymer. An illustrative example of a non-block polymer may be a poly(acrylamide) (PAM).

In various approaches, the ratio by weight of the polymer precursor to the copolymer may be less than about 1:8. In a preferred approach, the ratio by weight of the polymer precursor to the copolymer may be about 1:3. In another approach, the ratio by weight of the polymer precursor to the copolymer may be about 1:1. In one approach, the range of ratios of polymer precursor to copolymer may be from about 1:1 to about 1:11.

In one approach, the catalyst may be an acid catalyst. Illustrative examples of acid catalysts include hydrochloric acid (HCl), nitric acid, sulfuric acid, etc.

In other approaches, the catalyst may be a base catalyst. Illustrative examples of base catalysts include sodium carbonate, ammonia, ammonium carbonate, potassium carbonate, sodium hydroxide, etc.

In various approaches, the concentration of the catalyst may be in a range of about 1 weight % (wt %) to about 2 wt % of a total weight of the ink.

In one approach, the solvent of the ink may be water. In some approaches, the solvent may be a combination of water and an organic solvent. Illustrative examples of organic co-solvents include ethanol, methanol, isopropanol, etc. In an exemplary approach, the solvent includes a combination of water and ethanol.

In one approach, the ink may include a precursor of a ceramic component. Illustrative examples of the precursor of the ceramic component include titanium isopropoxide, titanium diisopropoxide bis(acetylacetonate), copper nitrate, aluminum chloride ($AlCl_3$), iron (III) chloride ($FeCl_3$), nickel nitrate, cobalt nitrate, copper(II) chloride ($CuCl_2$), etc. In one exemplary approach, the precursor of the ceramic component in the ink may be tetraethoxyl silane (TEOS). A ratio by weight of ceramic component to polymer precursor in the ink may be about 1:1.

In some approaches, the ink may include an additional component. For example, an additional component may be silicon oxide, titanium oxide, nickel oxide, etc.

FIG. 1 shows a method 100 for printing a three-dimensional (3D) structures using an ink, in accordance with one embodiment. As an option, the present method 100 may be implemented to form structures such as those shown in the other FIGS. described herein. Of course, however, this method 100 and others presented herein may be used to provide applications which may or may not be related to the illustrative embodiments listed herein. Further, the methods presented herein may be carried out in any desired environment. Moreover, more or less steps than those shown in FIG. 1 may be included in method 100, according to various embodiments. It should also be noted that any of the aforementioned features may be used in any of the embodiments described in accordance with the various methods.

Step 102 of method 100 includes printing a three-dimensional (3D) structure using an ink, where the ink includes a polymer precursor, a block copolymer, a catalyst, and a solvent. In one approach, the solvent may be a composition of two or more solvents, e.g., water and an organic solvent. The ink may have any composition described herein, e.g., it may be one of the inks described above.

In one approach, the printing of the 3D structure is performed by a DIW technique. The DIW method includes a nozzle having an extrusion diameter in a range of about 10 µm to less than 800 µm. In some approaches, the ink may be used in a nozzle having a diameter of less than 250 µm. In some approaches, the ink may be used in a nozzle with a diameter of 50 µm or less. In other approaches, the ink may be used in a nozzle with a diameter of 30 µm or less. In yet other approaches, the ink may be used in a nozzle having an extrusion diameter of about 10 µm.

In some approaches, the ink may be mixed prior at adding the ink to the nozzle for DIW. In other approaches components of the ink may be mixed in the nozzle during printing by DIW.

Step 104 of method 100 includes immersing the 3D structure in a solvent for forming a gel at an elevated temperature. The temperature for gelation of the 3D structure may be in a range of greater than 60° C. to about 100° C. In some approaches, the immersing results in transforming the ink of the printed 3D structure to a wet gel. Preferably, the solvent is not miscible with water. Also, preferably, the solvent has a boiling point greater than the temperature of the heating during gelation of the 3D structure. For example, in one approach, forming the gel may at 80° C., then the solvent would preferably have a boiling point greater than 80° C., and more preferably greater than 100° C.

Gelation of the 3D structure may include immersion of the 3D structure in a solvent such as iso-octane. In other approaches, gelation of the 3D structure may include immersion of the 3D structure in a solvent such as one of the following: decane, undecane, tridecane, etc.

Step 106 of method 100 includes drying the 3D structure. In one approach, the drying includes freeze drying the 3D structure. In one approach, the 3D structure may be freeze dried under liquid nitrogen. In one approach, the 3D structure may be freeze dried under the solid form of carbon dioxide (i.e., dry ice). Methods of freeze drying the 3D structure are generally known by one skilled in the art.

In another approach, step 106 of method 100 includes super critical drying the 3D structure. Before super critical drying, the wet gel of the 3D structure preferably is soaked in acetone to exchange all previous solvents from the structure to acetone. Methods of super critical drying are generally known by one skilled in the art.

An optional step 108 of method 100 includes heating the dried 3D structure in an inert atmosphere, in open air, etc. for forming a pyrolyzed 3D structure. Pyrolysis techniques known by one generally skilled in the art may be used for heating the 3D structure. In some approaches, in which pyrolysis of the 3D structure may result in carbonization of the 3D structure when conducting in an inert atmosphere. In other approaches, pyrolysis of the 3D structure may result in a 3D structure having only inorganic components when conducting in open air.

Figure 2:
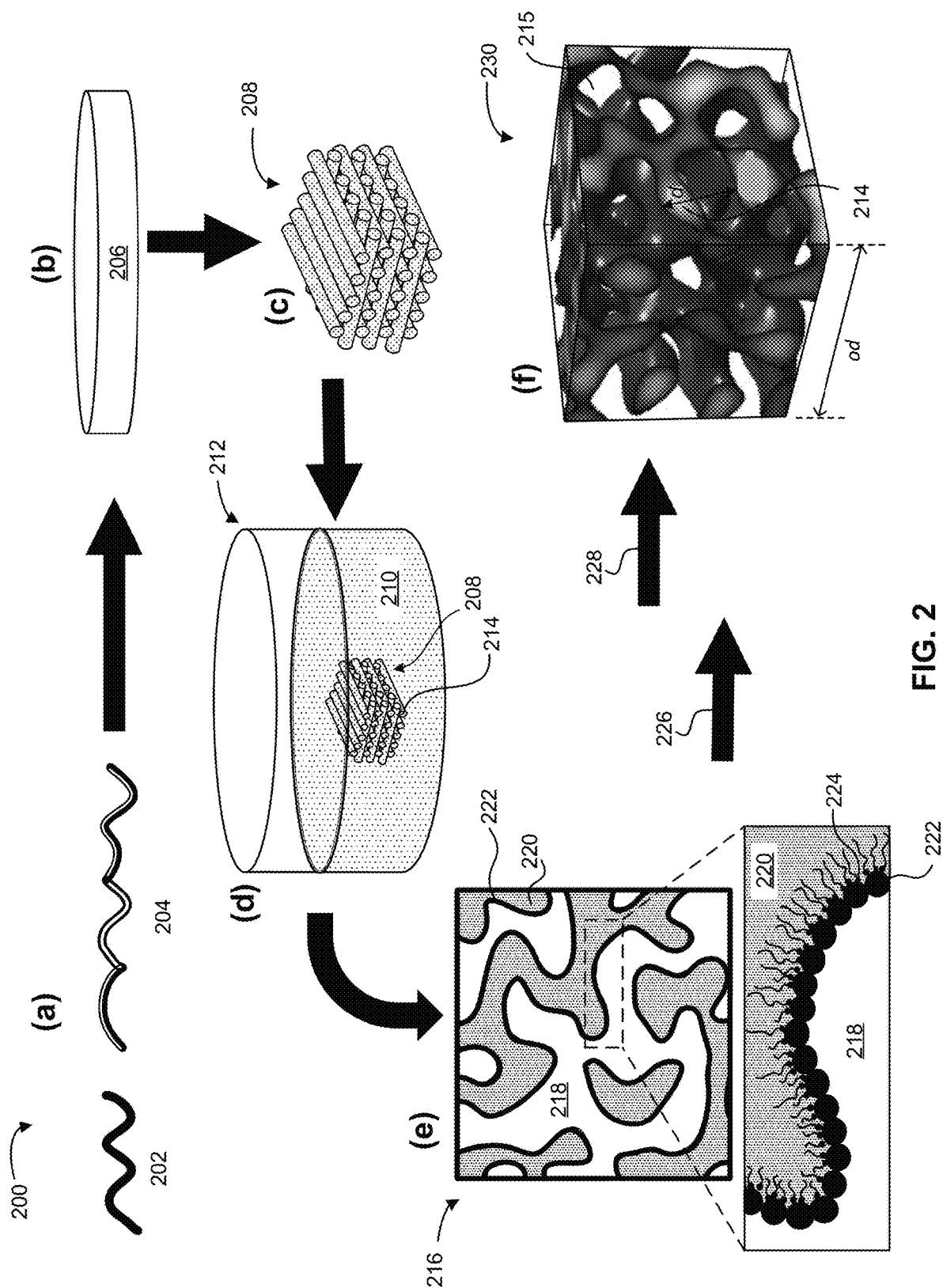
FIG. 2 is a schematic drawing of a method, according to one embodiment.

FIG. 2 shows a schematic drawing of a method 200 for printing a three-dimensional (3D) structures using an ink, in accordance with one embodiment. As an option, the present method 200 may be implemented to form structures such as those shown in the other FIGS. described herein. Of course, however, this method 200 and others presented herein may be used to provide applications which may or may not be related to the illustrative embodiments listed herein. Further, the methods presented herein may be carried out in any desired environment. Moreover, more or less steps than those shown in FIG. 2 may be included in method 200, according to various embodiments. It should also be noted that any of the aforementioned features may be used in any of the embodiments described in accordance with the various methods.

FIG. 2 represents a schematic drawing of the synthesis route and proposed mechanism of method 200, according to one embodiment. The method 200 begins in part (a) with a resol-like polymer precursor 202 component and a triblock copolymer 204 component. These components form a homogenous mixture 206 in part (b) that includes an acid catalyst, and solvent, e.g., water and ethanol (EtOH).

The homogenous mixture 206 may be used as an ink to form a 3D structure 208 by direct ink writing (DIW) techniques as shown in part (c). As depicted, the DIW process allows the ink of the homogenous mixture to form a geometric shape, e.g., a log pile formation having channels extending along the length of the 3D shape. In addition, the DIW process is an engineered process of forming a 3D structure 208, where each ligament and feature is engineered to a predetermined dimension.

As shown in part (d), the 3D structure 208 is immersed in a solvent 210 for transforming the ink of the 3D structure into a wet gel through a gelation process 212. The 3D structure 208 may be immersed, soaked, submerged, etc. in the solvent 210 at an elevated temperature, for example, about 80° C. for a duration of time until the material of the 3D structure transforms into a wet gel. In some approaches, the 3D structure may be immersed in the solvent at an elevated temperature for about 3 to 7 days.

Part (e) shows a magnified representation of a bicontinuous structure 216 present in the ligaments 214 of the 3D structure 208 (see part (d)). Following evaporation of part of the solvent of the ink used to form the homogenous mixture 206 (see part (b)), the bicontinuous structure 216 may include an immiscible continuous water-rich phase 218 and a resol-rich phase 220 formed during phase separation that occurs during immersion of the 3D structure 208 in the solvent 210 (see part (d)). As shown, the bicontinuous nature of the bicontinuous structure 216 shows two distinct phases, the water-rich phase 218 and the resol-rich phase 220, that may coexist in the structure thereby resulting in a bicontinuous structure.

A magnified view of the pores in part (e) shows that the cross-linked polymers 222 that include block copolymer components 224 may stabilize the phase separated bicontinuous structure 216.

The structure is dried 226 thereby forming micropores (pores having an average diameter greater than 200 nm and less than 10 µm) and mesopores (pores having an average diameter greater than about 10 µm and less than about 1 mm) in the structure. In some applications, the dried structure may be heated in a pyrolysis process 228 under inert atmosphere or air to form smaller pores, such as nanopores (pores having an average diameter less than approximately 200 nm, in some instances as small as 10 nm) in the resulting carbonized 3D structure 230.

Part (f) shows a schematic drawing of a portion of a carbonized 3D structure 230. The ligaments 214 of the carbonized 3D structure 230 may have an average diameter d less than 100 µm. The carbonized 3D structure 230 of the bicontinuous structure 216 may represent a final bicontinuous porous structure where the two phases, 222, 218 of part (e) result in carbon ligaments 214 and pores 215, respectively.

In one embodiment, a product includes a 3D printed structure having ligaments, where an average diameter of the ligaments may be in a range of about 10 µm to about 500 µm.

In one approach the average diameter of the ligaments may be in a range of 20 μm to about 250 μm.

In one approach, the 3D structure may have at least one outer dimension greater than about one centimeter. In some approaches, as shown in FIG. 2, the carbonized 3D structure 230 has an outer dimension od as defined as the length from one edge of the structure to the opposite edge of the structure in a longitudinal direction. In some approaches, the 3D structure may have at least one outer dimension od in a range of greater than one millimeter to less than about one centimeter. In some approaches, the 3D structure may have at least one dimension greater than 10 s of centimeters.

In one approach, the product may be essentially free of particles, for example, the product may be greater than 99% free of particles. Particles may be defined as components with an average diameter greater than 1 nanometer (nm). In some approaches, the product may be essentially free of any component with an average diameter greater than 1 nm.

In one approach, the product has a plurality of pores defined by the ligaments. The average diameter of the pores may be less than 100 nanometers (nm).

Experiments

In a typical procedure, a pre-prepared polymer precursor 0.5 g was mixed with 3 g Pluronic F127 (Sigma-Aldrich, St. Louis, MO), 3 g water, 0.4 g ethanol and 0.03 g 2M HCl to afford clear polymer ink. Any other ceramic precursors such as tetraethoxyl silane (TEOS) can be introduced to generate homogeneous ink system. The prepared ink was then direct-ink written onto a substrate. The printed object was then immersed into isooctane and cured at 80 degree C. After gelation, the wet gel was washed by acetone and water. Afterwards it was freeze-dried and treated to pyrolysis to form a carbonized structure.

Figure 3:
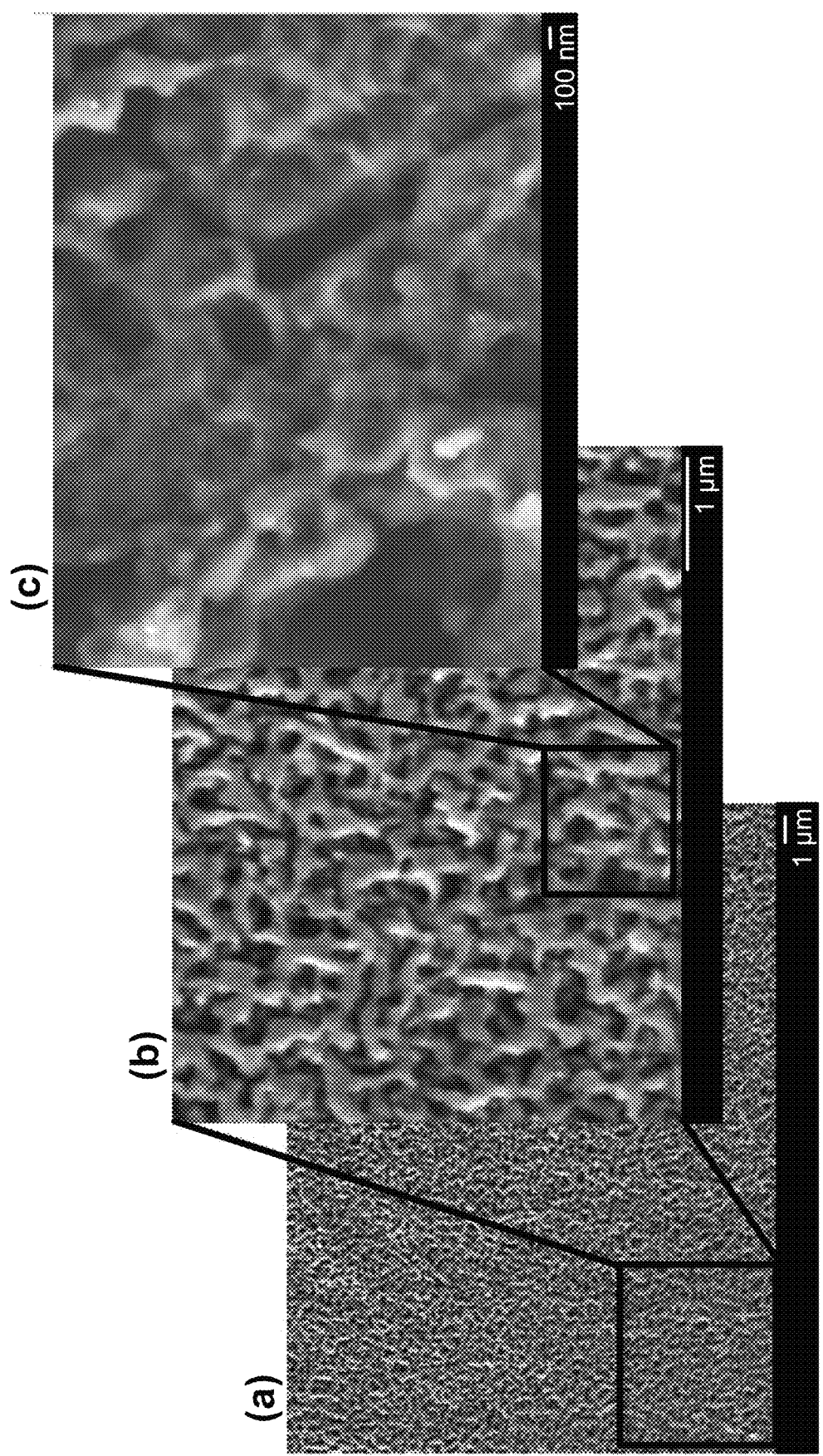
FIG. 3 is a series of scanning electron microscope images of a bicontinuous porous carbonized structure using a low content resol-like polymer precursor, according to one embodiment. The image of part (a) is the lowest magnified view of the structure. The image of part (b) is a magnified view of a portion of the image of part (a). The image of part (c) is a magnified view of a portion of the image of part (b).

FIG. 3 shows a series of scanning electron microscopy (SEM) images of a bicontinuous porous carbonized structure formed using a low concentration of resol-like polymer precursor and a method described herein. A bicontinuous structure may include two distinct phases that are continuous and co-exist. Part (a) is a low magnification SEM image of the porous carbonized structure formed with a low concentration of resol-like polymer precursor. Part (b) is a higher magnification of a portion of the image in part (a). Part (c) is a higher magnification of a portion of the image in part (b).

Figure 4:
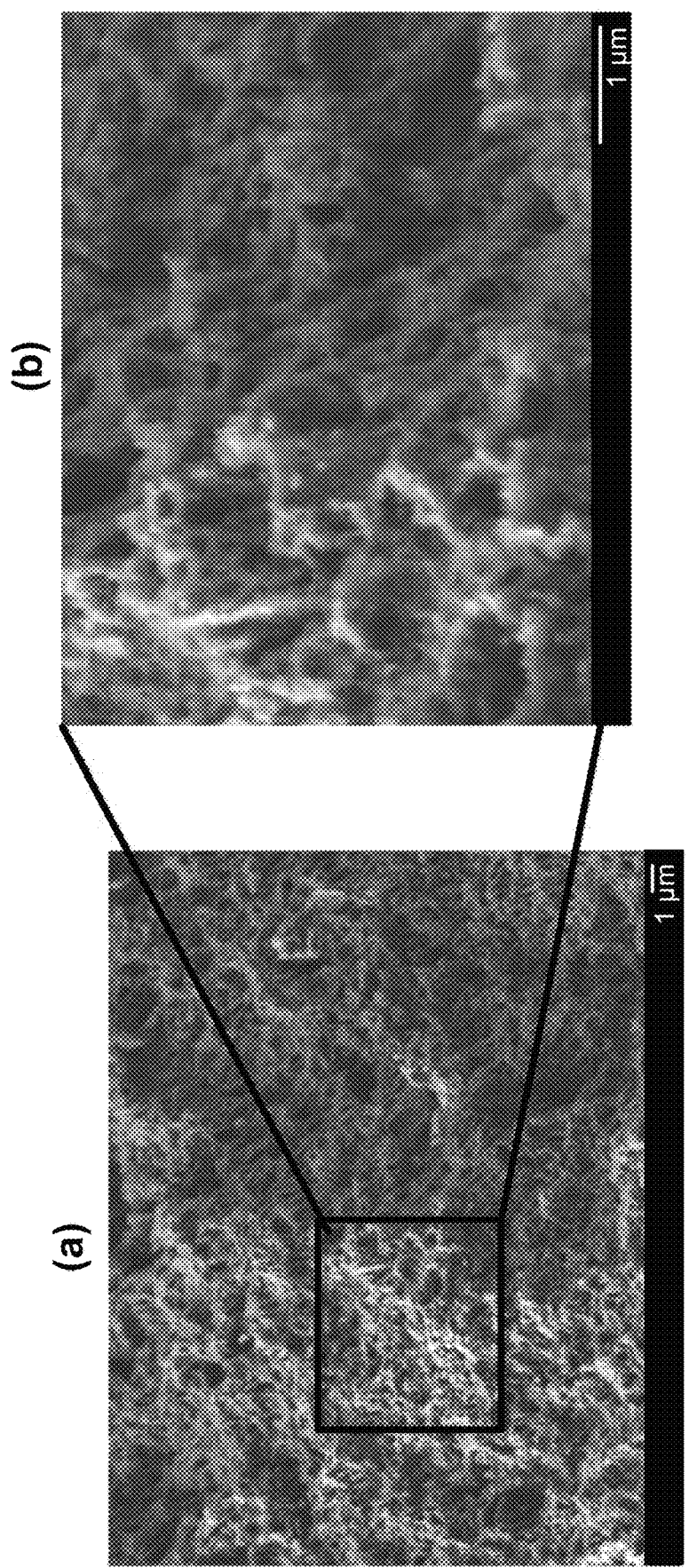
FIG. 4 is a series of scanning electron microscope images of a hierarchically porous carbonized structure using a high content resol-like polymer precursor, according to one embodiment. The image of part (a) is the lowest magnified view of the structure. The image of part (b) is a magnified view of a portion of the image of part (a).

FIG. 4 shows a series of SEM images of a hierarchically porous carbonized structure using a high concentration of resol-like polymer precursor and a method described herein. A high concentration of resol-like polymer precursor may yield a final structure having pores separated by a carbon backbone and thus the pore structure may not be continuous. In various approaches, a different formulation of the polymer precursor may yield a different final morphology of the porous carbonized structure. For example, a low concentration of resol-like polymer precursor may yield a bicontinuous porous carbonized structure (see FIG. 3) and a high concentration of resol-like polymer precursor may yield a hierarchically porous carbonized structure (FIG. 4). Part (a) of FIG. 4 is a low magnification SEM image of the porous carbonized structure formed with a high concentration of resol-like polymer precursor. Part (b) is a higher magnification of a portion of the image in part (a).

Figure 5:
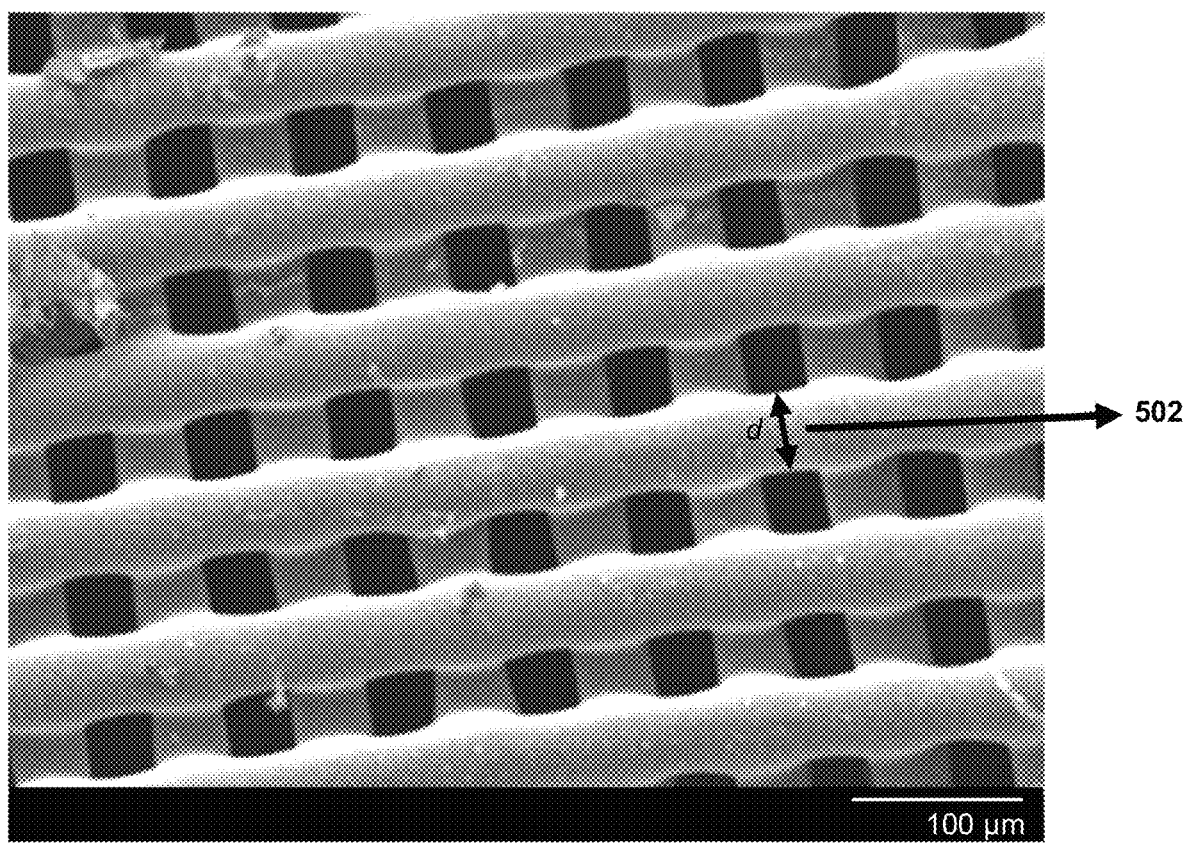
FIG. 5 is a scanning electron microscope image of a printed three-dimensional structure, according to one embodiment.

FIG. 5 is an image of a printed 3D structure using a method as described herein. The image demonstrates high resolution of the ligaments of the structure using the method of 3D printing as described. As shown, a ligament 502 has an average diameter of approximately 30 μm. Moreover, the printed 3D structure has substantially uniform ligaments 502, for example, where a first set of ligaments extends along the length of the structure in a longitudinal direction and a second set of ligaments extend along the structure in a direction orthogonal to the first set of ligaments. A printed 3D structure may have a plurality of sets of ligaments.

Figure 6A:
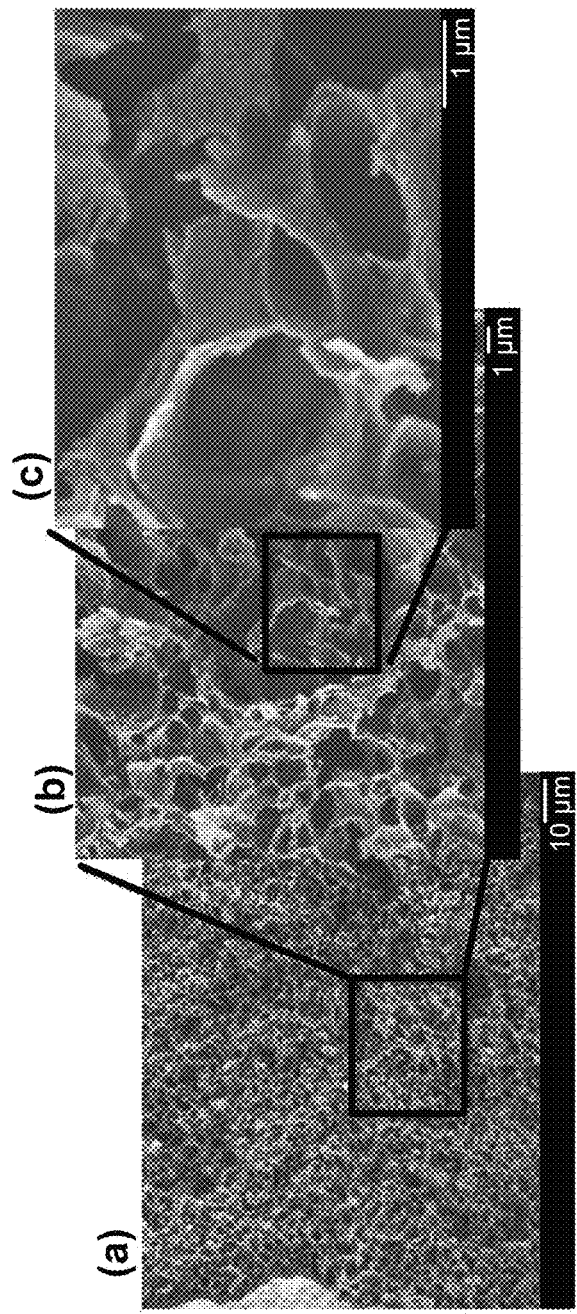
FIG. 6A is series of scanning electron microscope images of a bicontinuous hierarchically porous silica structure before pyrolysis, according to one embodiment. The image of part (a) is the lowest magnified view of the structure. The image of part (b) is a magnified view of a portion of the image of part (a). The image of part (c) is a magnified view of a portion of the image of part (b).

FIG. 6A shows a series of SEM images of a bicontinuous porous silica precursor 3D structure aerogel before pyrolysis, according to one embodiment. Part (a) is a low magnification of the bicontinuous porous silica 3D structure. Part (b) is a higher magnification of a portion of the image in part (a). Part (c) is a higher magnification of a portion of the image in part (b).

Figure 6B:
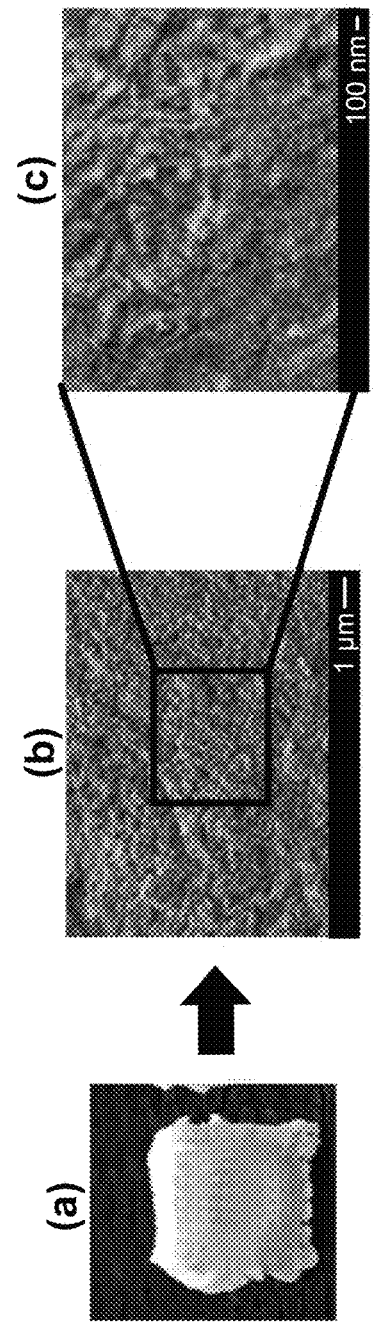
FIG. 6B, part (a) is an image of a pyrolyzed 3D porous silica structure, according to one embodiment.

FIG. 6B, part (a) is an image of the carbonized bicontinuous porous silica 3D structure after the pyrolysis step of a method, according to one embodiment. Part (b) is a SEM image of the carbonized structure of part (a). Part (c) is a magnified view of a portion of the SEM image in part (b).

In Use

Various embodiment described herein may be used for energy storage, for example, super capacitors and lithium-ion batteries. Some embodiments may be used for catalysts supporting. Some embodiments may be used for water purification, sensors, $CO_2$ reduction, flow batteries and water splitting devices.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An ink, comprising:
   a polymer precursor, wherein the polymer precursor is a formaldehyde resin;
   a copolymer, wherein a ratio by weight of the polymer precursor to the copolymer is in a range from about 1:1 to about 1:11;
   a catalyst; and
   a solvent,
   wherein the ink is physically characterized as being extrudable into self-supporting ligaments.

2. The ink as recited in claim 1, further comprising a precursor of a ceramic component.

3. The ink as recited in claim 2, comprising an additional component, wherein the additional component is selected from the group consisting of: silicon oxide, titanium oxide, and nickel oxide.

4. The ink as recited in claim 2, wherein the precursor of the ceramic component is tetraethoxyl silane (TEOS).

5. The ink as recited in claim 1, wherein the formaldehyde resin is selected from the group consisting of: phenol formaldehyde resin, urea formaldehyde resin, resorcinol formaldehyde, and melamine formaldehyde resin.

6. The ink as recited in claim 1, wherein the copolymer is at least one copolymer selected from the group consisting of: a triblock copolymer and a non-block copolymer.

7. The ink as recited in claim 1, wherein the catalyst is an acid catalyst.

8. The ink as recited in claim 1, wherein the catalyst is a base catalyst.

9. The ink as recited in claim 1, wherein a concentration of the catalyst is in a range of about 1 weight % to about 2 weight % of a total weight of the ink.

10. The ink as recited in claim 1, wherein the polymer precursor is different than the copolymer.

11. The ink as recited in claim 1, wherein the ink is physically characterized as being formable into a gel when the ink is immersed in a second solvent.

12. The ink as recited in claim 1, wherein the ink is substantially free of particles.

13. The ink as recited in claim 1, wherein the ink is physically characterized as being formable into a gel having a bicontinuous structure including a continuous water-rich phase and a resol-rich phase upon the ink being immersed in a second solvent.

14. The ink as recited in claim 2, wherein a ratio of the ceramic component to the polymer precursor is about 1:1.

15. The ink as recited in claim 1, wherein the solvent includes water.

16. The ink as recited in claim 15, wherein the solvent includes an organic co-solvent.

17. The ink as recited in claim 16, wherein the organic co-solvent is selected from the group consisting of: ethanol, methanol, and isopropanol.

18. A method for forming a three dimensional structure using the ink as recited in claim 1, the method comprising:
printing a three-dimensional structure using the ink;
immersing the printed three-dimensional structure in a second solvent for forming a gel; and
drying the printed three-dimensional structure.

* * * * *